Sept. 21, 1954 G. R. RADLEY 2,689,903
ELECTRIC RANGE SURFACE HEATING UNIT
Filed June 3, 1950 2 Sheets-Sheet 2
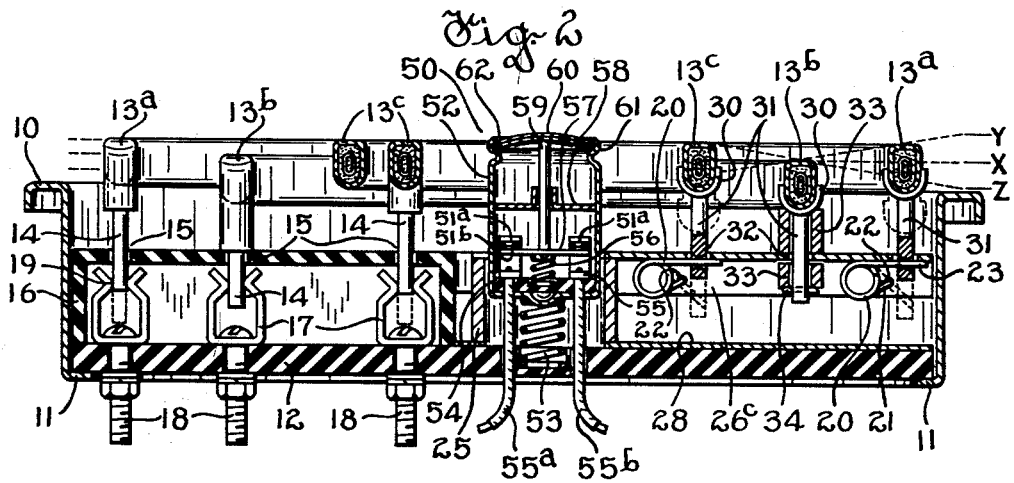
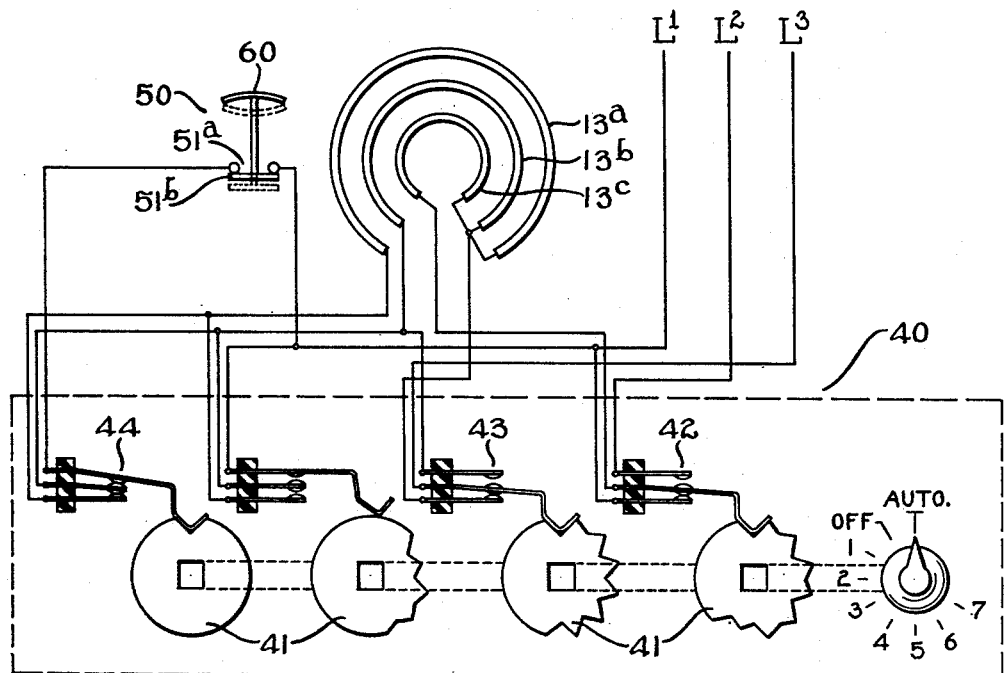

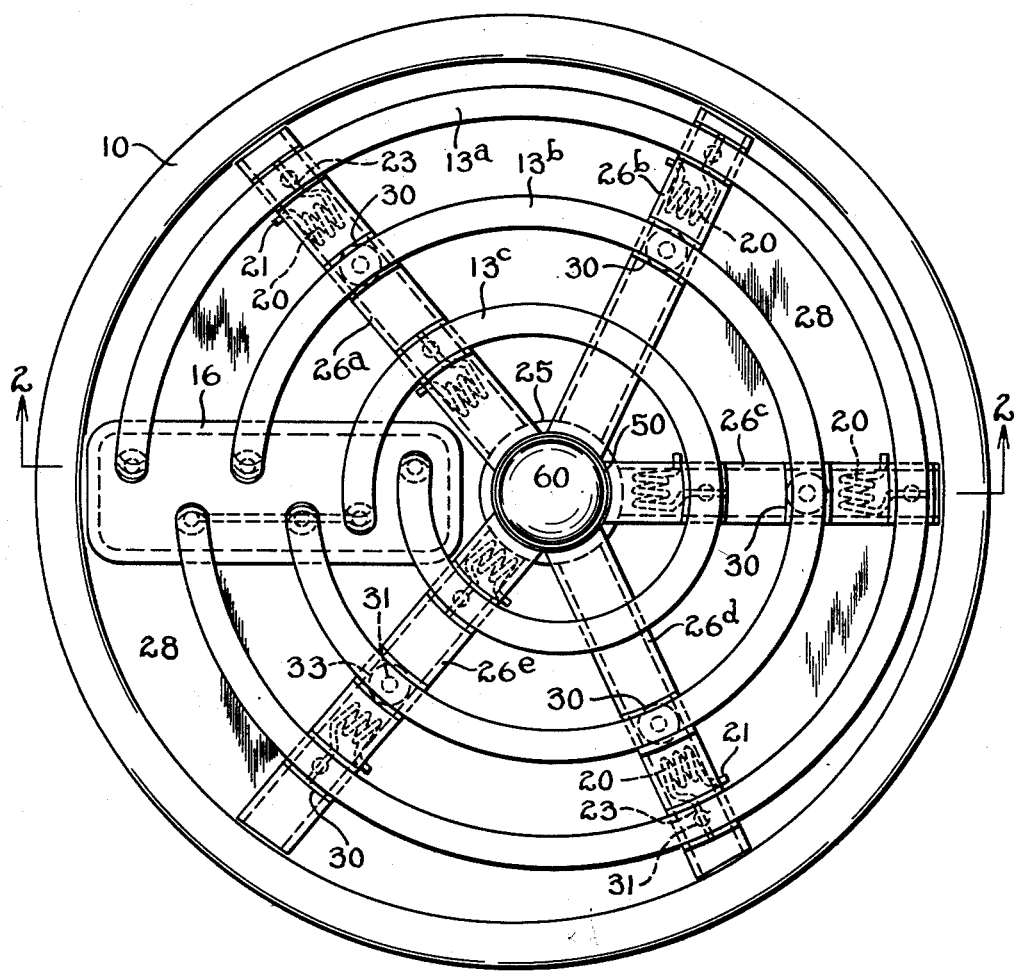

Patented Sept. 21, 1954

2,689,903

UNITED STATES PATENT OFFICE 2,689,903

ELECTRIC RANGE SURFACE HEATING UNIT

Guy R. Radley, Whitefish Bay, Wis., assignor to Cutler-Hammer, Inc., Milwaukee, Wis., a corporation of Delaware Application June 3, 1950, Serial No. 166,033

3 Claims. (Cl. 219—37)

1

This invention relates to improvements in electric range surface heating units.

An object of this invention is to provide an electric range surface heating unit which is of improved construction and is easy and economical to manufacture.

Another object is to provide an electric range surface heating unit which protects against boilover of liquids.

Another object is to provide an electric range surface heating unit which provides for easy replacement of the reflecting material below the heating elements.

Another object is to provide an electric range surface heating unit having improved means for providing good thermal contact between the heater elements and the bottom of a vessel placed upon them even though the bottom of the vessel be not truly flat.

Other objects and advantages will hereinafter appear.

In the accompanying drawings which illustrate an embodiment of my invention,

Figure 1 is a top plan view of an electric range surface heating unit incorporating the features of my invention;

Fig. 2 is a vertical sectional view taken along the line 2—2, as shown in Fig. 1, and Fig. 3 is a schematic and diagrammatic representation illustrating my system for preventing boil-over.

In Figs. 1 and 2 the heating unit is shown as having an outer circular rim member 10 which is made of stainless steel or other metal. At the lower end of said rim member there is an inwardly turned flange 11 on which is supported a circular disc 12 which is made of a relatively strong insulating material such as Transite.

Circular heater elements 13ª, 13ᵇ, 13ᶜ are supported in a manner hereinafter to be described on a spider assembly which consists of a central tubular metal member 25 to which are attached by welding or other means U-shaped supporting arms 26ª, 26ᵇ 26ᶜ, 26ᵈ, 26ᵉ. The spider assembly is easily removed from the unit housing simply by lifting, and when in place it is supported by the insulating bottom disc 12.

In order to insure good thermal contact between the heater elements and the bottoms of vessels which may be placed upon them, I mount the heater elements upon the spider arms in the following manner. Clips 30 are attached to the outer metal sheath of the heater elements by welding or other means. Depending from clips

2

30 are studs 31 which are positioned to be inserted in holes 32 in U-shaped spider arms 26ª to 26ᵉ. To prevent undue movement of the heater element terminals 14 in the terminal clips 17, the holes 32 in spider arms 26ª and 26ᵉ have very small clearance for the studs 31 while the holes 32 in arms 26ᵇ, 26ᶜ and 26ᵈ have large clearance for the studs. This allows for expansion and contraction of the heater units. As best shown in Fig. 2, heater element 13ᵇ is fixed against vertical displacement on spider arm 26ᶜ by means of bushings 33 and spring clip 34 which cooperates with stud 31. Similar mounting of heater element 13ᵇ is made on spider arms 26ª, 26ᵇ, 26ᵈ and 26ᵉ.

However, heater elements 13ª and 13ᵇ are not fixed against vertical displacement. They are normally urged to a level above that of heater element 13ᵇ by stainless steel helical springs 20 which are positioned between the depending sides of U-shaped spider arms 26ª to 26ᵉ and thus are shielded from the radiant heat of the heater elements. Springs 20 are mounted horizontally with one end 21 projecting through a punched hole 22 in one side of the spider arm and the other end 23 projecting through an opening in the stud 31. In this manner heater element 13ᶜ is mounted on each of spider arms 26ª to 26ᵉ and in the same manner heater element 13ᶜ is mounted on spider arms 26ª, 26ᶜ and 26ᵉ. Upward movement of heater elements 13ª and 13ᶜ is limited by the engagement of spring ends 23 with the underside of spider arms 26ª to 26ᵉ. Downward movement of heater elements 13ª and 13ᶜ may be limited by the engagement of clips 30 with the upper surface of the spider arms, or preferably, by the engagement of the lower ends of studs 31 with the upper surface of insulating disc 12. Thus it will be seen that if a vessel having a substantially flat bottom is placed upon the heating unit, the upper faces of the heater elements 13ª to 13ᶜ will lie along a plane as indicated in Fig. 2 by dotted line $x$. However, more commonly the vessel bottom is deformed in one direction or the other. If the vessel bottom is convexly shaped, the heater elements 13ª to 13ᶜ will assume a position as indicated by dotted line $y$ and will continue to make line contact with the bottom of the vessel. Similarly, if the vessel bottom is concavely shaped, the heater elements will lie along a plane as indicated by dotted line $z$. Warping of the heater elements 13ª to 13ᶜ is also reduced to a minimum by making the ratio of width to length greater than unity. The preferred ratio will vary between 1:1.2 and 1:2. As will be obvious, reduction in warping will further assist in maintaining line contact between the vessel and the heater elements. Thus, it will be seen that my improved electric range surface heating unit assures sufficient heat conduction regardless of the shape of the vessel bottom which is placed upon it.

Another important feature of my invention is the provision for ready removal and replacement of the heater elements. The heater elements are substantially circular in shape and have depending end terminals 14 which are inserted through openings 15 in the terminal box 16 which is formed of insulating material. Inside the terminal box the terminals 14, which are preferably made of nickel, engage with their respective stainless steel spring terminal clips 17. Terminal bolts 18 hold clips 17 in position and pass through insulating disc 12 for connection with conductors (not shown). It should be noted that the clips 17 have gripping edges 19, which edges serve to break through any scale which may form on the terminals.

Thus, it will be seen that my improved electric range surface heating unit permits ready removal of the heater elements 13a to 13c. This has an additional advantage in that it also permits easy cleaning of the unit without the necessity of tipping the entire unit up out of its mounting in the stove, a practice which if done too often tends to weaken and break the conductors connected to the unit terminals. As an additional aid to the easy cleaning of the unit and also to assist in the reflection of radiant heat, I prefer to cover the insulating base or disc 12 with a circular sheet 28 of aluminum foil or other similar material, the sheet having portions cut out so that the terminal box 16 and the tubular member 25 will project therethrough. Should the foil sheet 28 become soiled, it is then a simple matter to remove the heater elements and their supporting spider assembly and replace the sheet with a fresh one.

Another very important feature of my improved electric range surface heating unit is the provision of novel means for providing quick-heat while protecting against boil-over. In Fig 3 I have shown the heater elements 13a to 13c and associated switching means indicated generally by numeral 40. It will be seen that the switch means provides seven different degrees of heat by rotation of the cam members 41 to commutate the various circuits. However, in addition to the usual seven positions of the switch, designated by the numerals 1 through 7, and the "off" position, I have provided another position designated "Auto." In this position heater elements 13a, 13b and 13c are connected for energization across lines L¹ and L³. Element 13c is energized by a circuit which leads from line L¹ through closed contacts 42, through heater element 13c, and thence through closed contacts 43 to line L³. Heater elements 13a and 13b are energized by a circuit which leads from line L¹ through contacts 51 of control member 50, through closed contacts 44, thence through heater elements 13a and 13b and closed contacts 43 to line L³. The combined wattage of heater elements 13a, 13b and 13c is sufficient to rapidly bring liquids placed upon the unit to their boiling point. However, when control member 50 operates to open contacts 51a, the circuit through heater elements 13a and 13b is opened. This leaves only heater element 13c energized, and its wattage value is only sufficient to maintain a moderate heat. Under normal conditions, because of the time lag of the control member, the unit will remain at this heat until the user returns to reset the switch to whichever setting is desired for continued heating.

I will now describe the construction and operation of control member 50 in detail. Referring to Fig. 1 and more particularly to Fig. 2, control member 50 is shown as having a metal cartridge-like housing 52 which is positioned for vertical movement within tubular member 25. A compression spring 53 is positioned between the supporting base 12 and the lower end of housing 52 and serves to normally urge said housing to the position shown in Fig. 2. Within housing 52 is an insulating disc 54 on which are positioned a pair of stationary terminal members 55 having contact portions 51a. A compression spring 56 is positioned between insulating disc 54 and a bridging contact member 57, normally urging contact portions 51b which are mounted on member 57 into engagement with stationary contacts 51a. Above the contacts 51 is a metal protecting shield 58 which is peripherally welded or otherwise secured to the inner wall of housing 52. Shield 58 is centrally apertured to receive an actuating rod 59 the lower end of which abuts against bridging contact member 57. Downward movement of rod 59 serves to open contacts 51a and is effected by means of a bimetallic member 60.

Bimetallic member 60 is retained within a peripheral groove 61 formed near the upper end of tubular housing 52 and is protected against displacement by the turned over edge 62 of said housing.

Normally, the upper surface of member 60 is convex and projects beyond housing edge 62. In this manner good thermal contact is assured between it and the bottom of a vessel placed upon the unit. Also, the control member, similar to heater elements 13a and 13c, is depressed to a position determined by the configuration of the vessel bottom. In this manner, reliable and accurate calibration of the bimetallic member 60 is assured.

The operation of the control member is as follows. With the vessel containing the liquid to be heated placed on the surface heating unit, switch 40 is placed in the position indicated by "Auto.", whereupon current flows through heater elements 13a, 13b and 13c. In series with the circuit through heater elements 13a and 13b are the contacts 51a which are connected in circuit by the conductors 55a and 55b which are led through the lower end of housing 52 and through supporting base 12. The temperature of the bimetallic member 60, which is in direct contact with the vessel bottom, increases with that of the liquid contained therein. At a temperature dependent upon its calibration, preferably between 85° C. and 95° C., the bimetallic member snaps to present a concave surface. In so doing, it depresses the actuating rod 59 which in turn forces open contacts 51 against the bias of spring 56. Thereupon, current no longer flows through heater elements 13a and 13b. Since the heating capacity of element 13c is insufficient to bring the liquid on up to its boiling point, boil-over of the liquid is thus effectively prevented.

It should also be noted that when the control member 50 is in its open or tripped condition, bimetallic member 60 will no longer be in contact with the vessel bottom. Instead, the vessel will rest upon housing edge 62. This is an important feature because it helps to preserve the calibration of the bimetallic member 60 which would otherwise be affected by the high temperatures involved in frying, broiling, etc. Thus tubular housing 52, in addition to providing supporting means for the bimetallic disc 60, also effectively protects it against the deleterious effects of excessive heat.

I claim:

1. An electric range surface heating unit comprising a heat insulating base member, a heater element supporting spider assembly supported by said base member, said spider assembly including downwardly turned U-shaped supporting arms formed of an oxidation resistant metal, three circular heating elements for concentric mounting upon said supporting arms, means fixedly mounting the middle of said heating elements to said supporting arms, and means resiliently mounting the inner and outer heater elements upon said supporting arms, said last mentioned means comprising studs depending downwardly from said inner and outer elements for projection through openings in the upper face of said supporting arms, and stainless steel helical springs horizontally mounted between the sides of said supporting arms adjacent said openings with one end operably connected to their respective studs, whereby said elements may move relatively to and independently of each other to insure a shape-conforming engagement with the bottom of a vessel placed on said unit and the springs permitting such movement are shielded from the radiant heat emitted by said elements.

2. An electric range surface heating unit comprising a housing having a heat insulating disc-shaped base retained within a circular metal rim, a spider assembly supported by said base and having an open central tubular supporting member with inverted U-shaped stainless steel supporting arms extending radially therefrom, a middle circular heating element fixedly mounted on said supporting arms, inner and outer circular heating elements having downwardly depending studs projecting through openings in the upper face of said supporting arms, stainless steel helical springs horizontally mounted within said supporting arms adjacent said openings and having one end thereof operably connected to their respective studs for resiliently urging said latter heating elements to a position above that of said middle element whereby said elements may be moved relatively to and independently of each other and to said middle element to insure a shape-conforming engagement with the bottom of a vessel placed on said unit, a control member for at least one of said heating elements contained within a tubular housing positioned for axial movement within said central tubular supporting member, a bimetallic normally convex actuating disc positioned at the upper end of said control member housing for normal engagement with said vessel bottom, means formed integrally with the upper end of said control member housing for separating said vessel bottom and said disc when the latter has snapped into a concave shape under the influence of a preselected degree of heat, and means positioned between said base and said control member housing for resiliently urging the latter into engagement with said vessel bottom.

3. The combination with an electric range surface heating unit comprising a plurality of heating elements for heating of a vessel positioned thereon, of a tubular metal housing resiliently mounted relative to said heating elements to urge the upper end of said housing above said heating elements, a disc-shaped electrical insulating member positioned at one end of said housing, a pair of stationary contacts fixed to said disc within said housing, and in circuit with at least one of said heating elements, a bridging contact member normally resiliently urged into engagement with said stationary contacts by a compression spring positioned between said contact member and said insulating disc, a dish-shaped bimetallic disc retained within a peripheral groove formed in the upper end of said housing so that its normally convex side will project in an axial direction beyond the end of said tube for surface contact with vessels positioned on said heating elements, an inwardly turned portion at the same end of said housing for retaining said bimetallic disc in said groove and for protecting said disc when the surface with which said control member is in contact is at a temperature higher than its actuating temperature by preventing surface contact between the vessel and said disc while the normally convex side of the latter is concave, and an axially movable actuating rod positioned between said disc and said bridging contact member for moving said latter member out of engagement with said stationary contacts upon actuation of said disc.

References Cited in the file of this patent
UNITED STATES PATENTS

| Number | Name | Date |
|---|---|---|
| 2,207,462 | Kurtz | July 9, 1940 |
| 2,207,634 | Myers et al. | July 9, 1940 |
| 2,261,533 | Vineberg | Nov. 4, 1941 |
| 2,262,026 | Hastings | Nov. 11, 1941 |
| 2,263,350 | Challet | Nov. 18, 1941 |
| 2,270,293 | Grunder | Jan. 20, 1942 |
| 2,272,658 | Challet | Feb. 10, 1942 |
| 2,288,967 | Challet | July 7, 1942 |
| 2,311,371 | Crowley | Feb. 16, 1943 |
| 2,399,423 | Bletz | Apr. 30, 1946 |
| 2,409,414 | Bletz | Oct. 15, 1946 |
| 2,410,013 | Clark | Oct. 29, 1946 |
| 2,419,083 | Myers | Apr. 15, 1947 |
| 2,427,944 | Clark | Sept. 23, 1947 |
| 2,430,715 | Grayson | Nov. 11, 1947 |
| 2,534,097 | Akeley | Dec. 12, 1950 |
| 2,632,436 | Williams | Mar. 24, 1953 |